United States Patent
Levionnais et al.

(10) Patent No.: US 10,728,728 B2
(45) Date of Patent: Jul. 28, 2020

(54) METHOD AND A DEVICE FOR MANAGING CONTACTLESS APPLICATIONS

(71) Applicant: ORANGE, Paris (FR)

(72) Inventors: Philippe Levionnais, Caen (FR); Stephane Petit, Herouville Saint Clair (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/192,505

(22) Filed: Jun. 24, 2016

(65) Prior Publication Data
US 2016/0381495 A1 Dec. 29, 2016

(30) Foreign Application Priority Data

Jun. 26, 2015 (FR) ...................................... 15 55982

(51) Int. Cl.
*H04W 4/80* (2018.01)
*H04W 12/06* (2009.01)
(Continued)

(52) U.S. Cl.
CPC .......... *H04W 4/80* (2018.02); *G06F 13/4282* (2013.01); *G06Q 20/0457* (2013.01);
(Continued)

(58) Field of Classification Search
CPC .... G06Q 20/00–20/425; H04W 4/008; H04W 12/00–12/12; H04B 5/00; H04B 5/0025–5/0031
See application file for complete search history.

(56) References Cited

U.S. PATENT DOCUMENTS

| | | | |
|---|---|---|---|
| 2003/0167207 A1* | 9/2003 | Berardi ................ | G06Q 10/025 705/16 |
| 2005/0212690 A1* | 9/2005 | Nishikawa ............. | G06K 7/006 340/932.2 |

(Continued)

FOREIGN PATENT DOCUMENTS

JP 2005202621 A * 7/2005

OTHER PUBLICATIONS

IEEE 100 the Authoritative Dictionary of IEEE Standards Terms, Dec. 2000, Published by Standards Information Network IEEE Press, Seventh edition, p. 1029.*

(Continued)

*Primary Examiner* — Gennadiy Tsvey
(74) *Attorney, Agent, or Firm* — David D. Brush; Westman, Champlin & Koehler, P.A.

(57) ABSTRACT

The invention relates to a portable object (OP) suitable for rendering at least one secure service (S) via a near field (NFC). The object comprises:
  a near field module (NFC) having an antenna (AN) and a microcontroller (CLF) for managing near field communication with a near field reader unit (2) external to the portable object; and
  a secure element (SE) comprising:
    memory means (MEM) for storing applications (APS) and data (DPS) relating to at least one secure service (S); and
    a communications module (I1) for communicating with the near field module (NFC) in order to exchange data relating to the secure service (S).

The object is characterized in that it also includes a serial communications module (USB) connected to the security element (SE, SIM, I4), and in that the applications (APS)

(Continued)

and the data (DPS) of the secure service (S) are transmitted to the security element via said serial communications module (USB).

10 Claims, 3 Drawing Sheets

(51) Int. Cl.
*G07B 15/00* (2011.01)
*G06Q 20/04* (2012.01)
*G06Q 20/38* (2012.01)
*G06Q 20/32* (2012.01)
*G06Q 20/34* (2012.01)
*H04W 12/00* (2009.01)
*G06F 13/42* (2006.01)
*H04W 12/08* (2009.01)

(52) U.S. Cl.
CPC ..... *G06Q 20/3229* (2013.01); *G06Q 20/3278* (2013.01); *G06Q 20/3552* (2013.01); *G06Q 20/38215* (2013.01); *G07B 15/00* (2013.01); *H04W 12/0023* (2019.01); *H04W 12/06* (2013.01); *H04W 12/08* (2013.01)

(56) References Cited

U.S. PATENT DOCUMENTS

| | | | | |
|---|---|---|---|---|
| 2006/0155913 | A1* | 7/2006 | Nishikawa | G06K 7/0004 711/100 |
| 2006/0208066 | A1* | 9/2006 | Finn | G06K 7/0004 235/380 |
| 2007/0155430 | A1* | 7/2007 | Cheon | H04M 1/72527 455/558 |
| 2009/0069050 | A1* | 3/2009 | Jain | G06Q 20/3227 455/558 |
| 2009/0115571 | A1* | 5/2009 | Bishop | G06K 19/07749 340/5.61 |
| 2009/0143104 | A1* | 6/2009 | Loh | G06Q 20/32 455/558 |
| 2009/0144456 | A1* | 6/2009 | Gelf | G06F 13/4022 710/8 |
| 2009/0172279 | A1* | 7/2009 | Yuan | G06K 7/0008 711/115 |
| 2011/0131421 | A1* | 6/2011 | Jogand-Coulomb | G06F 8/61 713/189 |
| 2011/0215159 | A1* | 9/2011 | Jain | G06K 19/07739 235/492 |
| 2011/0219159 | A1* | 9/2011 | Park | G06F 13/00 710/300 |
| 2012/0327819 | A1* | 12/2012 | Liang | G06K 7/0008 370/277 |
| 2014/0074698 | A1* | 3/2014 | Poole | G06Q 20/3226 705/39 |
| 2014/0279528 | A1 | 9/2014 | Slaby et al. | |
| 2014/0279546 | A1* | 9/2014 | Poole | H04B 5/0031 705/44 |
| 2014/0304094 | A1 | 10/2014 | Reddy et al. | |
| 2015/0039494 | A1 | 2/2015 | Sinton et al. | |
| 2015/0081461 | A1 | 3/2015 | Adrangi et al. | |
| 2015/0095219 | A1 | 4/2015 | Hurley | |

OTHER PUBLICATIONS

French Search Report dated May 9, 2016 for French Application No. 1555982, filed Jun. 26, 2015.

"Personalisierung von zweitem SE", Research Disclosure, Mason Publication, Hampshire, GB, vol. 610, No. 27, Jan. 19, 2015 (Jan. 19, 2015), p. 1, XP007143836.

Sebastian Hans, "Report from F2F Berlin in March", ETSI Security week Jun. 2015, Jun. 22, 2015 (Jun. 22, 2015), XP055270950.

English translation of the French Written Opinion dated May 9, 2016 for French Application No. 1555982, filed Jun. 26, 2015.

* cited by examiner

METHOD AND A DEVICE FOR MANAGING CONTACTLESS APPLICATIONS

This Application claims priority to and the benefit of French Patent Application No. 1555982, filed Jun. 26, 2015, the content of which is incorporated herein by reference in its entirety.

TECHNICAL FIELD

The invention relates in general manner to telecommunications, and more precisely to contactless communications using short range radio technologies, in particular of the near field communications (NFC) type.

The invention applies more particularly to terminals having physical and software resources including a security element and a passive type NFC module suitable for communicating with external reader terminals.

STATE OF THE ART

Near field communications (NFC), as based mainly on International Standards Organization (ISO) standard 14443, make use of wireless technologies for enabling information to be exchanged between two peripherals that are spaced apart by a short distance, typically less than ten centimeters.

By way of example, such contactless applications may relate to electronic transactions in the field of public transport, or indeed to identification applications, to access control applications, etc. NFC communication is established between two contactless entities, referred to as NFC entities, one operating as a contactless card and the other operating as a contactless card reader. Such an NFC entity is made up of a near field communications device, also referred to below as an "NFC component", and an associated antenna that enables it to set up contactless communication with another NFC entity. The NFC entity operating as a contactless card may for example correspond to an NFC tag. An NFC entity operating as a card reader may correspond by way of example to an electronic payment terminal or to equipment for checking electronic transport tickets, or indeed a tag reader adapted to identify radio frequency (RF) tags, depending on the applications in question.

The functions of a contactless entity may be provided by a mobile telephone terminal, also referred to as a "mobile terminal". The term "mobile terminal" is used to designate any type of terminal that can be moved while remaining in communication with a mobile communications network. By way of example, it may be a mobile telephone or indeed computer, an electronic tablet, etc.

Certain applications require a certain level of security. Under such circumstances, they are managed jointly by the mobile terminal and by the security element that is associated therewith. The non-sensitive portion of the application (graphics interface, etc.) is loaded in the mobile terminal. The sensitive portion, i.e. the portion that requires secure execution and secure data, is downloaded from the mobile network under the control of an intermediary referred to as a trusted service manager (TSM) between the service supplier and the client's mobile terminal, and is then installed in the security element associated with the mobile terminal, e.g. a subscriber identity module (SIM) card. Communication may be established within the terminal between the contactless application of the SIM card and the contactless device. Thereafter, the contactless component installed in the mobile terminal enables dialog to take place between the mobile terminal, and more precisely the application in question, and another contactless entity situated in the proximity of the terminal. Certain mobile terminal architectures thus make it possible to enable mobile telephony functions to co-operate with NFC type functions in secure manner.

Nevertheless, such mobile terminals are expensive and bulky, and as a result are suitable only for a certain category of people, and in particular not for children.

Other architectures that are inexpensive and based on a smart card (e.g. canteen cards for children) have also been proposed. Nevertheless, such a system requires the presence of a specific reader (of smart cards) in order to load an application or the corresponding data.

Unfortunately, that type of reader is not readily available for individuals. Furthermore, such cards are usually single-application only (the child has both a transport card and a canteen card).

Other inexpensive architectures have been proposed that are based on a simple transponder (NFC tag) suitable for including a plurality of services (canteen, library, etc.) but in this context the services are not secure and they all have the same identifier. That therefore does not constitute a genuine multi-application architecture.

There therefore exists a need for certain categories of people, and in particular children who do not have advanced mobile telephones, to be able to benefit from a plurality of secure contactless services, such as for example paying for canteen meals, bus tickets, and library subscriptions, while using a single appliance that is simple and inexpensive.

The invention seeks to improve that situation.

The Invention

To this end, in a hardware aspect, the invention provides a portable object suitable for rendering at least one secure service via a near field, the object comprising:
  a near field module having an antenna and a microcontroller for managing near field communication with a near field reader unit external to the portable object; and
  a secure element comprising:
    memory means for storing applications and data relating to at least one secure service; and
    a communications module for communicating with the near field module in order to exchange data relating to the secure service;
  the portable object being characterized in that it also includes a serial communications module connected to the security element, and in that the applications and the data of the secure service are transmitted to the security element via said serial communications module.

The invention thus finds the advantage of enabling secure NFC communications to be ensured while using an object that is very simple and into which applications and data relating to a secure service have been loaded, not via the mobile communications network, as is usually done, in particular for a mobile telephone, but via a USB serial connection. The term "secure service" is used to mean a service that is executed under the control of a security element so that sensitive data of the service is not vulnerable.

Advantageously, the object of the invention comprises nothing more than an NFC component, a security element, and a USB type serial connector. All of these components are lightweight, inexpensive, and compact. It should be observed that with this architecture, there is no need to have a module for communicating over the network (a 3G, 4G, WiFi, etc.) module.

The term "module" may cover equally well a software component or a hardware component or a combination of hardware and software components, a software component itself corresponding to one or more computer programs or subprograms, or more generally to any program element suitable for performing a function or a set of functions as described for the modules in question. In the same manner, a hardware component corresponds to any element of a hardware assembly suitable for performing a function or a set of functions for the module in question integrated circuit, smart card, memory card, etc.).

In a particular embodiment of the invention, a portable object as described above is further characterized in that it does not have any electrical power supply internal to the object nor any energy storage device.

This embodiment of the invention makes it possible to have a device that even lighter in weight and simpler since it does not require any (optionally rechargeable) battery, nor does it require any internal power supply.

Specifically, since there is no need for a radio communications module, it is easy to overcome this power supply constraint: a radio communications module needs to be powered in order to operate correctly, but the portable object of the invention does not necessarily have such a module. This omission of a power supply enables the portable object to be made lighter in weight, more independent, and less expensive than a similar object that contains a battery, for example.

In a variant of this first embodiment, a portable object as described above is further characterized in that it is adapted to be electrically powered solely when it is connected via its serial communications module for exchanging data with an external device.

This variant embodiment of the invention makes it possible to power the portable object while transmitting thereto the data of the secure service, thus advantageously performing two functions simultaneously (powering and loading the application and the secure data of the service into the security element), unlike an NFC smartphone, for example, which is necessarily powered by an internal battery while it is loading the application and the data from the mobile network via its radio module.

In a second variant of this first embodiment, that may be implemented as an alternative to or together with the preceding variant, a portable object as described above is further characterized in that it is adapted to be electrically powered only when it is connected for exchanging data with a near field reader unit.

This variant implementation of the invention makes it possible to power the portable object only when it is necessary to read data therefrom for the needs of the application (e.g. to consume a transport ticket via an NFC port) and also advantageously, under certain circumstances, to transmit application data thereto, e.g. when it is not possible to use the USB connection.

In a second particular embodiment of the invention, which may be used as an alternative to or together with the preceding embodiment, a portable object as described above is further characterized in that the security element has electrical contacts and in that the serial communications module is connected to the security element via at least one electrical contact.

Advantageously, in this embodiment, it is possible to use the electrical contacts of the security element. In particular, if this security element is a SIM type card, it is possible advantageously to use a data input/output contact (and in particular the ISO I/O contact C7).

Specifically, this contact remains available in the context of the invention (whereas in the context of a mobile telephone, it is naturally used for communication between the telephone and its security element). The serial communications module of the invention serves to convert the serial signal entering via the USB interface into a signal that is appropriate for the input/output of the SIM card.

In another hardware aspect, the invention also provides a terminal for managing at least one portable object as described above, the terminal being connectable to the portable object by the serial module and to a communications network by a network communications module, the terminal being characterized in that it comprises:
  a request module for requesting a secure service from a server of the communications network;
  a receive module for receiving secure data relating to the portable object or to the secure service from a server of the communications network; and
  a transmit module for transmitting data to the portable object via the serial module, the data relating to the portable object or to the secure service.

In another hardware aspect, the invention also provides a system for operating portable objects, the system comprising:
  at least one portable object as described above;
  at least one terminal as described above for managing the portable object;
  an applications server on the communications network for offering at least one secure service;
  a global management server for the portable object on the communications network, the global management server possessing access rights to the security element of the portable object; and
  at least one local management server for at least one secure service of the portable object, the server being on the communications network and suitable for obtaining access rights to the application relating to the secure service in the security element of the portable object.

In a functional aspect, the invention also provides a method of managing secure services for a portable object as described above, the portable object being connected to a terminal by a serial communications module, the terminal also being connected to a communications network by a network communications module, the method being characterized in that it comprises the following steps on the terminal:
  requesting a secure service from a server of the communications network;
  receiving secure data relating to the portable object or to the secure service from a server of the communications network; and
  transmitting data to the portable object via the serial module, the data relating to the portable object or to the secure service.

In another functional aspect, the invention also provides a method of performing a secure service on a portable object as described above, the object being connected to a terminal via its serial communications module, the method being characterized in that it comprises the following steps on the portable object:
  receiving secure data via the serial communications module and relating to the object or to a secure service; and installing secure data in the security element of the portable object.

The functional aspects of the invention provide at least the same advantages as those provided by the above-described hardware aspects. The optional characteristics mentioned for the first hardware aspect may be applied in method terms.

In another functional aspect, the invention also provides a method of operating portable objects for a system as described above, the method being characterized in that it comprises the following steps:

initializing the portable object;
the terminal requesting a service S from a server of the communications network;
a server of the communications network transmitting secure data to the terminal, the data relating to the secure service;
the terminal receiving secure data relating to the secure service; and
transmitting secure data relating to the secure service to the portable object via the serial communications module.

Advantageously, in this aspect, data is transmitted to the bracelet very simply from a network server (e.g. the Internet or in a variant a mobile network) to the terminal in charge of transmitting data to the bracelet when the bracelet is connected thereto.

In a particular implementation of this aspect, the invention also provides a method of operating portable objects as described above, characterized in that the initialization step includes the global management server transmitting to the portable object a generic secure application for the secure services of the portable object, and in that the secure data transmitted to the terminal is personalization data for the requested secure service.

Advantageously, in this aspect, the generic cardlet is supplied to the object when it is initialized by the management server. Thereafter, personalization data for a secure service is subsequently transmitted to the object and installed in the memory of its security module, in a dedicated memory zone, under the control of the cardlet.

In another particular implement of this aspect, the invention also provides a method of operating portable objects as described above, characterized in that the secure data transmitted to the terminal comprise data of a secure application relating to the secure service as transmitted by a server of the communications network for the requested secure service.

Advantageously, in this aspect, a particular cardlet (also known as an applet) is supplied to the object on request of the service. The initialization step does not require a generic cardlet to be installed. The global management server that possesses rights to write in the object may have delegated its rights, and under such circumstances the cardlet can come from the local management server (SGL) or even from the kiosk (KSK).

In another hardware aspect, the invention also provides a computer program suitable for being implemented for a method of managing secure services on a portable object as defined above, the program comprising code instructions that, when the program is executed by a processor of the terminal, perform the steps of the method.

In another hardware aspect, the invention also provides a computer program suitable for being implemented for a method of providing a secure service on a portable object as defined above, the program comprising code instructions that, when the program is executed by a processor of the portable object, perform the steps of the method.

These computer programs present characteristics and advantages analogous to those described above with reference to the corresponding methods.

In yet another hardware aspect, the invention provides a data medium that is readable by a data processor and that contains a program comprising program code instructions for executing steps of any of the above-defined methods.

The invention can be better understood on reading the following description given by way of example and made with reference to the accompanying drawings.

THE FIGURES

DETAILED DESCRIPTION OF AN EMBODIMENT ILLUSTRATING THE INVENTION

Figure 1:
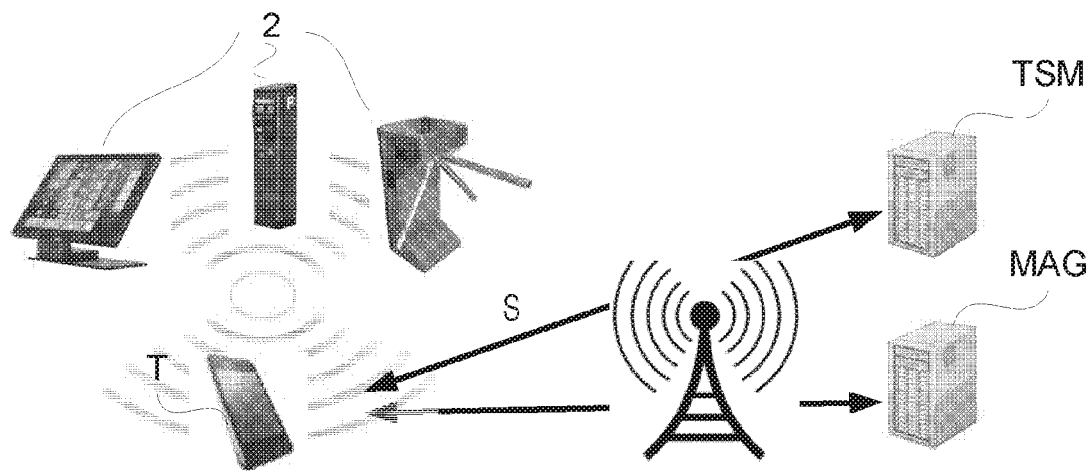
FIG. 1 shows the context of using mobile terminal suitable for providing secure NFC services in accordance with the prior art.

FIG. 1 shows the context of using a mobile terminal (T) or smartphone that is suitable for providing secure NFC services in accordance with the prior art.

By way of example, such an NFC service is a service of purchasing and using tickets for transport. The service is delivered in the form of applications and data stored in an "applications store" (MAG) by an application supplier, e.g. Apple or Android applications.

The mobile terminal T includes in particular an NFC component constituted by an NFC controller and an associated antenna, and a security element of the smart card type, specifically a SIM card. In association, these two elements enable secure NFC services to be used, i.e. services that guarantee to the client and holder of the mobile terminal a function of authenticating the security element of the mobile terminal, an identification function, and a function of making communication secure.

Conventionally, security relies on managing cryptographic keys that are contained in the security element.

In order to benefit from a secure NFC service (S) using the mobile terminal, i.e. a service that makes use of a security element, the service generally comprises two applications:

a non-secure application for installing on the mobile terminal (T), and including in particular the user interface; and a secure portion (APS), also known as an applet or a cardlet, for installing in the security element (SE), and comprising in particular programs for managing sensitive service data. The secure application is accompanied by data, generally including a secret cryptographic key associated with the service (K_AP).

The prior art architecture makes use of a platform generally referred to as a trusted service manager (TSM) for communicating with the secure element and suitable for managing firstly the lifetime of the NFC service (installation, loss or theft, change of equipment, etc.), and secondly secure remote communication with the application on the card, e.g. in order to personalize it. The TSM may optionally depend on a mobile network operator (MNO), not shown. The non-secure portion of the application (usage, interface, etc.) is loaded from the store (MAG) and installed on the mobile terminal (T) in order to communicate with the applet (APS), also referred to as a cardlet, that is to be found in the secure element. This architecture is defined by the Global Platform Consortium (which defines a set of specifications relating to deploying applications on secure elements). In this context, the various steps for operating an NFC service are thus as follows:

- loading the non-secure portion of the application from the application store;
- loading the secure application and the sensitive data for the service into the SIM card from the application server via the TSM, while using the network of the service operator; this type of loading is also referred to as "over-the-air" (OTA) loading;
- personalizing/managing the application via the TSM; and
- using the application to render the service (e.g. transport) by dialog between the mobile terminal (T), the NFC component, and the external reader (e.g. verifying a subscriber's transport ticket and decrementing the number of tickets available to that subscriber for the service).

A major problem with that architecture lies in its complexity, in particular concerning the mobile terminal: the terminal must necessarily have advanced functions, and in particular functions for communicating over the network of the mobile network operator with the TSM.

Unfortunately, not everybody has an advanced mobile terminal (for reasons of cost, security, complexity, and also of size, battery life, etc.).

Figure 2:
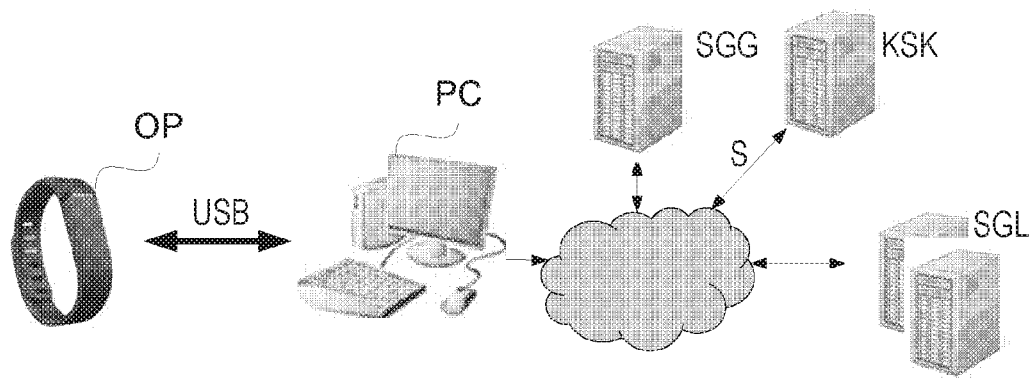
FIG. 2 shows the context of managing a portable object suitable for use in an embodiment of the invention.

FIG. 2 shows the context for managing a portable object that is suitable for use in an implementation of the invention.

In this example, the portable object (OP) is a bracelet that is very simple and inexpensive and suitable for wearing on the wrist, and carrying the user's services. The portable object could have any other form. Its only communications interfaces are a serial connection via a micro-universal serial bus (USB) port and a contactless interface of the NFC type.

Like the prior art mobile terminal described above with reference to FIG. 1, the bracelet may be used as a contactless card in association with various NFC reader terminals (2). It has an antenna, an NFC controller, and a smart card type security element, specifically a SIM card.

Unlike the above-described mobile terminal, it nevertheless does not have a display, any keys, a battery, or any module for communicating with the mobile network or with any other communications network, e.g. the Internet. The SIM card is preferably not removable. Seen from the outside, the terminal makes available only a micro-USB port for managing NFC services.

The presently proposed architecture makes use of three servers on the communications network (regardless of whether it is of the mobile type, or the Internet, etc.):

- a server SGG, which is the global manager for the bracelet; it controls the life cycle of the bracelet, independently of any applications that are associated therewith; it possesses a main key for the SIM card (referred to herein as K_SE);
- a kiosk server (KSK) stores applications and makes them available; by way of example, these applications may be associated with transport applications (trams, buses, etc.) in a given city; and
- a server SGL, which is the local manager of the bracelet; it performs local management of applications to be found on the bracelet, e.g. by way of information tracking or personalizing by the user; it also serves to manage data on the bracelet (loading new transport tickets, etc.). It possesses the keys of service applets on the SIM card (K_AP).
- there may be a plurality of servers SGL, each being responsible for one or more services;
- in a variant, these local operations may be performed via an application on the mobile terminal; nevertheless, it should be observed that under such circumstances, only non-confidential data can be made accessible directly on the terminal, unless a confidential code is presented; in a variant, if more sensitive data is subject to presenting higher-grade privileges, it is possible to obtain such privileges by accessing the bracelet management server; and
- in yet another variant, it would also be possible to authorize proximity downloading (via the NFC), in particular for data associated with the application.

An application and associated secret data are loaded into the bracelet via the USB communication module. The bracelet is connected by this module to an external terminal of the user, specifically a personal computer (PC) (but it could equally well be a smartphone, a tablet, etc.).

The loading of an application is controlled by a remote device, the management server SGG, which is the only server to have access rights to the secure element of the bracelet. It performs a role substantially identical to that of the TSM described above with reference to FIG. 1, however it should be observed that the bracelet is not connected to the network of the mobile operator (it does not have any communication module other than the USB and NFC modules).

The secure applications loaded into the bracelet may be compatible with battery-off type applications (i.e. applications that continue to function on a mobile telephone while its battery is low but just sufficient for powering the security element and the NFC component), which applications are loaded in the prior art in contactless mobile telephones.

Once the applications and data have been loaded into the bracelet, it may, in an independent mode (i.e. not connected to the mobile terminal), take the place of a contactless smart card in the context of services installed in the SIM card, and in a manner identical to the above-described mobile terminal (it may advantageously act as a bank card, a transport card, a library card, a canteen card, etc.).

Figure 3:
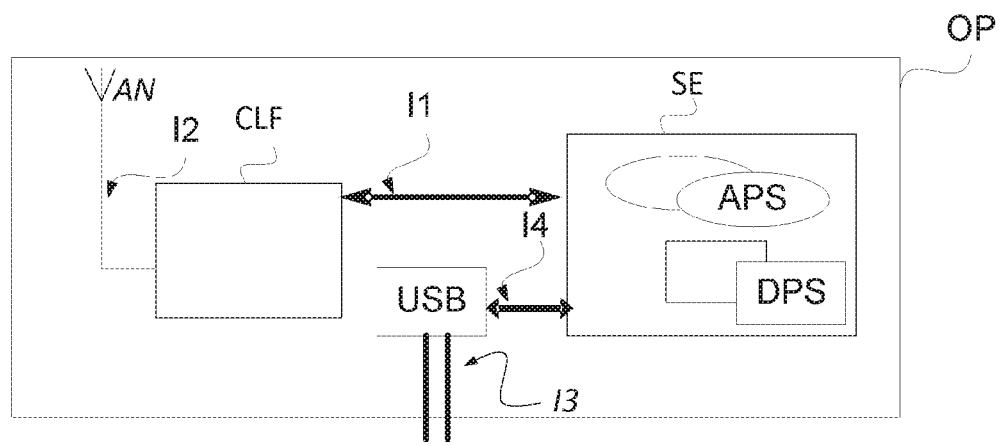
FIG. 3 shows the hardware architecture of a portable object in accordance with an embodiment of the invention.

FIG. 3 shows the hardware architecture of a portable object in an embodiment of the invention.

Figure 5:
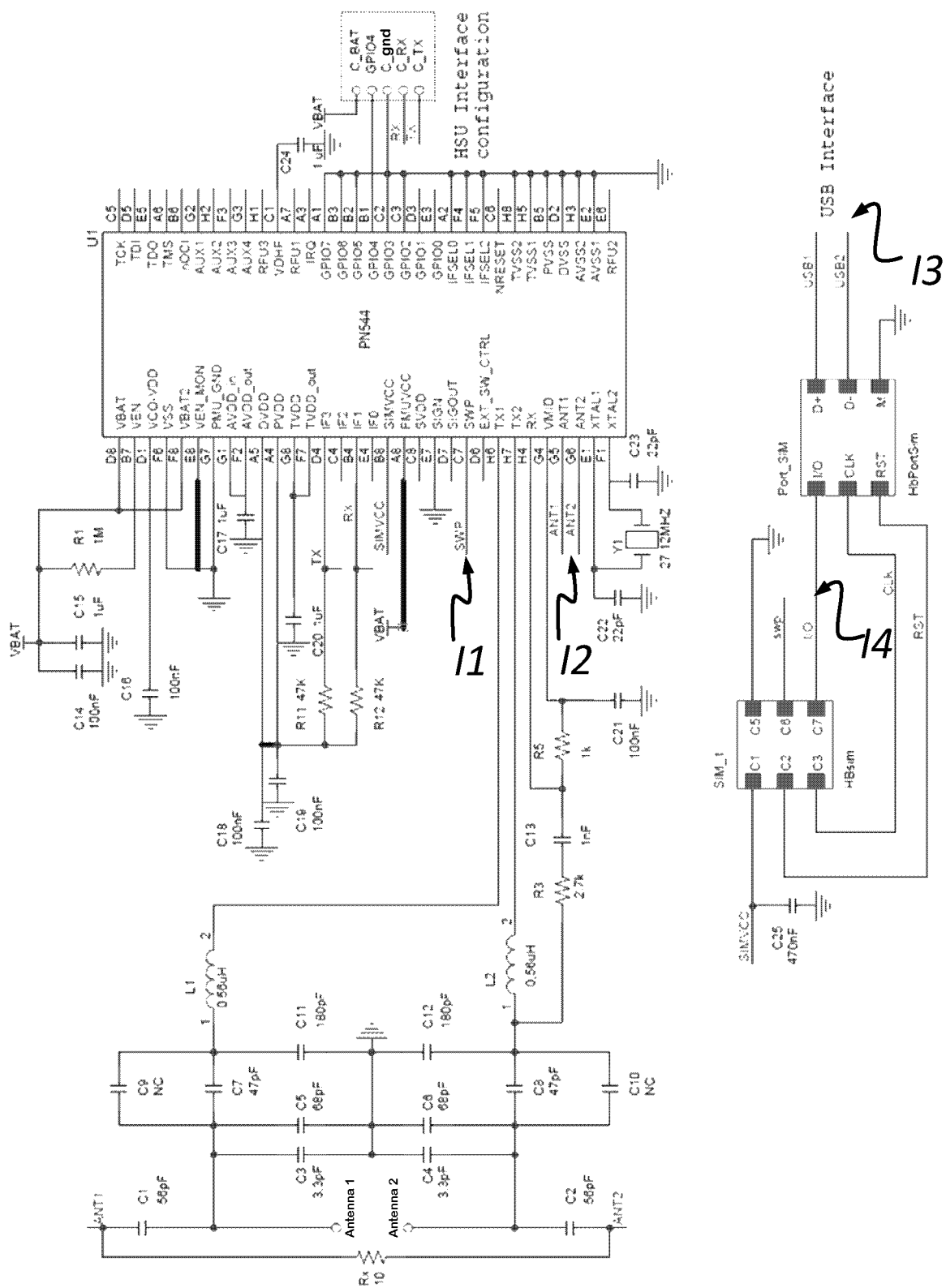
FIG. 5 is a detailed electronic circuit diagram of an object in an embodiment of the invention.

It comprises:

- an NFC component referred to as a contactless frontend (CLF) that is capable of providing NFC type near field communication with an external reader, e.g. a ticket validating reader (port) (2);
- NFC type near field communications means (I2) using an NFC antenna AN;
- a secure element (SE), specifically a SIM card, comprising at least:
  - cryptographic information relating to the security element (conventionally secret keys and the associated algorithms);
  - ISO 7816 type (SWP) means (I1) for communicating with the CLF module; and
  - memories for containing the applications (APS for secure applets) and/or personalization data (DPS for secure personalization data) of the contactless services;

a USB module for converting between the incoming USB serial type communication interface I3 suitable for establishing serial communication for receiving a program (APS) or data (DPS) for a service S having a USB terminal, and the communications interface I4 of the security element giving access to the SE in order to write secure data therein (applications and/or personalization data). The USB communications module of the invention provides the electrical and protocol adaptation necessary for conversion between the two interfaces (I3 and I4). In this embodiment of the invention, it serves in particular to convert the incoming serial signal from the USB interface into a signal appropriate for the ISO input/output contact C7 of the SIM card, as shown in FIG. 5.

Figure 4:
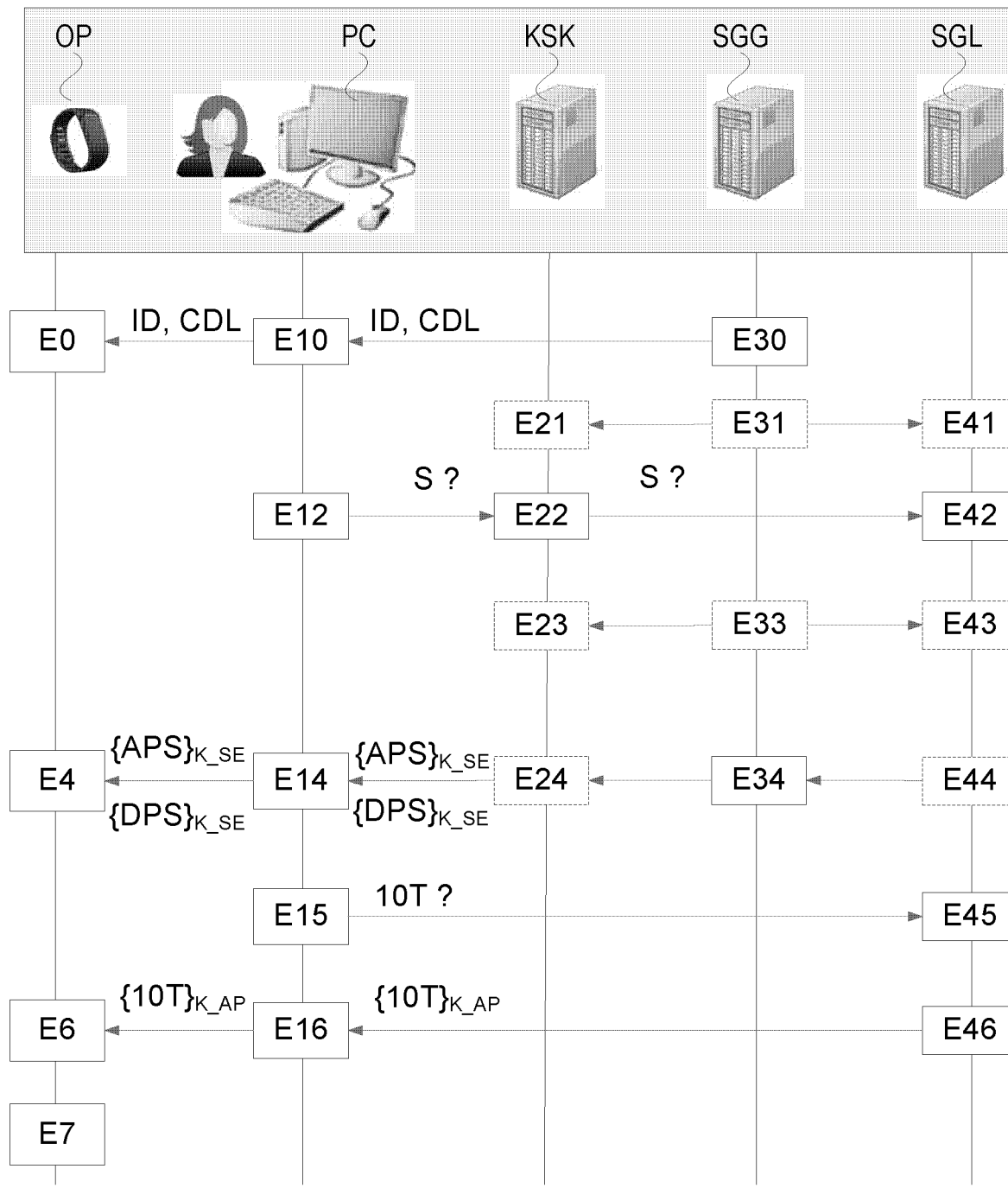
FIG. 4 is a flow chart showing the various steps of a method in an implementation of the invention for managing portable objects.

FIG. 4 is a flow chart showing the various steps of a method of managing portable objects in an implementation of the invention.

It is recalled at this point that the end-to-architecture for managing applications on the bracelet (OP) makes use of three servers, namely the global management server SGG for the bracelet; the kiosk server (KSK) for applications; and the local server (SGL) for managing applications on the bracelet. These servers may be distinct or they may coincide in the communications network.

During a step E0, the bracelet is initialized by the server SGG via the PC (E10) to which the bracelet is connected via the USB connection. The server SGG alone possesses rights of access to the secure element of the bracelet (in particular its secret key, referred to herein as K-SE). Specifically, during the corresponding step E30, the server SGG can load the following into the security element of the bracelet:

the identifier (ID) of the bracelet;
one or more applications associated with services, in the form of cardlets or applets; it is particularly advantageous to use this form of initialization when a single cardlet (written CDS) that is said to be "generic" serves to manage a plurality or indeed all of the services of the bracelet. Once the generic cardlet has been installed, each service for installing subsequently makes use of a dedicated memory zone in the memory of the security element under the control of the cardlet. This operation is referred to as personalizing the cardlet, and the application data is referred to as personalization data (DPS); and
the operational cryptographic keys of the cardlet(s) (K_AP).

During a step E31, referred to as a "delegation" step, the server SGG can optionally proceed to initialize one or more local servers SGL (step E41) or kiosk servers KSK (step E21). In particular, during this step, the server SGG can delegate the rights (e.g. secret keys) of the cardlet(s) associated with the various servers installed in the bracelet to one of the other servers (SGL or KSK). The steps drawn with dashed outlines are optional. In a variant, the rights will actually be supplied later during installation of a service, and they are not delegated.

During step E12, the user uses the PC to select a service S from the kiosk (KSK); in this example, the user selects a transport service or the city of Caen for the user's son who possesses a bracelet (OP) but not a smartphone.

The kiosk interrogates the local server SGL during a step E22/E42.

This step is not necessary if the prior delegation operation enables the kiosk to have the benefit of rights associated with the service, in which case it is possible to move on directly to the step E24. In this variant, the kiosk itself can possess the cardlet and/or the data, thereby taking on the role of the local SGL.

If the server SGL does not have rights over the bracelet, a delegation step identical to that described above (steps E33, E23, E43 identical to steps E31, E21, E41) can take place at this moment. The server SGG provides the other server (SGL or KSK) with the cardlet and/or the personalization data and/or the keys associated with the service.

If the server SGL possesses rights for the service (rights that were conferred thereto during a prior delegation step), the server SGL supplies the service to the PC for the bracelet:
in the form of a cardlet (APS); or
in the form of an application data (DPS) zone request for the cardlet (CDL) that has already been installed on the card, in particular during step E0 of initializing the bracelet.

During a step E14, the PC receives the application (APS) or the secure personalization data (DPS) from the server SGG (E44), from the server SGL (E34) if it possesses rights by delegation, or from the kiosk (E24) if it possesses rights by delegation.

During the step E4, the cardlet APS or the personalization data DPS is received via the USB port connected to the SIM card and loaded into the bracelet.

During a step E15, the user uses the PC to request the local server SGL to load (E45) ten transport tickets (10T) into the transport service (S) installed in the bracelet.

The server SGL then responds to the PC during a step E46, supplying the ten transport tickets (10T) to the PC (E16) for loading into the SIM card of the bracelet during a step E6.

Thereafter, the transport service is ready to be used during a final step E7 during which the wearer of the bracelet can use a ticket by presenting the bracelet to the NFC reader.

FIG. 5 is a detailed electronic circuit diagram corresponding to an embodiment of the invention.

The detailed diagram complies with the block diagram of FIG. 3. In particular the interfaces I1, I2, I3, and I4 corresponding respectively to the interfaces between the SIM card and the NFC module (I1), between the NFC component and the antenna (I2), between the SIM card and the USB module (I4), and between the USB module and the outside of the object (I3), can all be seen in the circuit diagram.

In a variant, a microprocessor may be connected to the ports referenced GPIO so that data coming from the antenna (544) transits via the additional microprocessor prior to being supplied to the SIM card, thereby enabling greater flexibility in use, greater speed, etc.

Naturally, the embodiment as described above is given purely by way of non-limiting indication, and numerous modifications may easily be provided by the person skilled in the art without thereby going beyond the ambit of the invention.

The invention claimed is:

1. A portable object suitable for rendering at least one secure service for a user via a near field, the portable object comprising:
a near field module having an antenna and a microcontroller for managing near field communication with a near field reader unit external to the portable object;
a security element, which is a SIM card and comprises:
a memory for storing an application that is secured by a secure key of the application and data relating to at least one secure service;

a first communications module for communicating with the near field module in order to exchange data relating to the secure service; and
an input/output serial contact;
a serial communications module, distinct from the first communications module, connected to the security element and having a first serial communications interface connectable to an external terminal of the user, the serial communications module is configured to convert a serial signal entering via the first serial communications interface into a signal that is appropriate for the input/output serial contact of the SIM card, wherein the application and the data of the secure service are transmitted to the security element via said serial communications module in the form of a serial signal, and the serial communications module having a second serial communications interface connected directly to the security element via the input/output serial contact of the SIM card;
a connected mode operable when the portable object is connected to the external terminal through the first serial communications interface and during which serial communications module receives the application and the data of the secure service from the external terminal through the first serial communications interface and transmits the application and data to the security element through the second serial communications interface; and
an independent mode operable when the portable object is disconnected from the external terminal and during which the security element exchanges data relating to the secure service with the external near field reader unit using the near field module.

2. The portable object according to claim 1, wherein the portable object does not have any electrical power supply internal to the portable object or any energy storage device.

3. The portable object according to claim 2, wherein the portable object is adapted to be electrically powered when connected via its serial communications module for exchanging data with the external terminal.

4. The portable object according to claim 2, wherein the portable object is adapted to be electrically powered when connected for exchanging data with the near field reader unit.

5. The portable object according to claim 1, wherein the SIM card has an input/output (I/O) electrical contact and the second serial communications interface is connected to the I/O electrical contact.

6. A system for operating portable objects, the system comprising:
at least one portable object suitable for rendering at least one secure service for a user via a near field, the portable object comprising:
a near field module having an antenna and a microcontroller for managing near field communication with a near field reader unit external to the portable object; and
a security element, which is a SIM card and comprises:
a memory for storing an application that is secured by a secure key of the application and data relating to at least one secure service; and
a first communications module for communicating with the near field module in order to exchange data relating to the secure service; and
an input/output serial contact;
a serial communications module, distinct from the first communications module, connected to the security element and having a first serial communications interface connectable to at least one external terminal of the user, the serial communications module is configured to convert a serial signal entering via the first serial communications interface into a signal that is appropriate for the input/output serial contact of the SIM card, wherein the application and the data of the secure service are transmitted to the security element via said serial communications module in the form of a serial signal, and the serial communications module having a second serial communications interface connected directly to the security element via the input/output serial contact of the SIM card;
a connected mode operable when the portable object is connected to the external terminal through the first serial communications interface and during which the serial communications module receives the application and the data of the secure service from the at least one external terminal through the first serial communications interface and transmits the application and data to the security element through the second serial communications interface; and
an independent mode operable when the portable object is disconnected from the at least one external terminal and during which the security element exchanges data relating to the secure service with the external near field reader unit using the near field module;
the at least one external terminal being connectable to the portable object by the first serial communications interface of the serial communications module and to a communications network by a network communications module, and which manages the portable object;
an applications server on the communications network for offering at least one secure service;
a global management server for the portable object on the communications network, the global management server possessing access rights to the security element of the portable object; and
at least one local management server for at least one secure service of the portable object, the local management server being on the communications network and configured to obtain access rights to the application relating to the secure service in the security element of the portable object.

7. A method of providing a service to a user on a portable object, the method comprising the following acts on the portable object:
connecting the portable object to an external terminal of the user, the portable object comprising:
a near field module having an antenna and a microcontroller, which is configured to manage near field communication with a near field reader unit external to the portable object;
a security element, which is a SIM card and comprises:
a memory for storing an application that is secured by a secure key of the application and data relating to at least one secure service;
a first communications module configured to communicate with the near field module in order to exchange data relating to the secure service; and
an input/output serial contact;
a serial communications module, distinct from the first communications module, connected to the security element and having a first serial communications interface connectable to the external terminal of the user and a second serial communications interface connected directly to the security element via the input/output serial contact of the SIM card that, receiving a first serial signal comprising the application and the data from the external terminal via the first serial communications interface of the serial communications module;

converting the first serial signal into a second serial signal that is appropriate for the input/output serial contact using the serial communications module;

transmitting the second serial signal comprising the application and the data from the serial communications module via the second serial communications interface to the input/output serial contact of the security element;

installing application and the data in the security element of the portable object;

disconnecting the portable object from the external terminal; and operating the portable object in an independent mode during which the security element can exchange data relating to the secure service with the external near field reader unit using the near field module.

8. A method of operating portable objects for a system, the system including:

at least one portable object suitable for rendering at least one secure service for a user via a near field, the portable object comprising:

a near field module having an antenna and a microcontroller configured to manage near field communication with a near field reader unit external to the portable object; and a security element, which is a SIM card and comprise:

a memory for storing an application that is secured by a secure key of the application and data relating to at least one secure service;

a first communications module for communicating with the near field module in order to exchange data relating to the secure service; and an input/output serial contact;

a serial communications module, distinct from the first communications module, connected to the security element and having a first serial communications interface connectable to at least one external terminal of the user and has a second serial communications interface connected directly to the security element via the input/output serial contact of the SIM card;

a connected mode operable when the portable object is connected to the at least one external terminal through the first serial communications interface; and an independent mode operable when the portable object is disconnected from the at least one external terminal and during which the security element exchanges data relating to the secure service with the external near field reader unit using the near field module;

the at least one external terminal, which is connectable to the portable object by the first serial communications interface and to a communications network by a network communications module, and which manages the portable object;

an applications server on the communications network for offering at least one secure service;

wherein the method comprises:

connecting the at least one external terminal to the first serial communications interface of the portable object;

initializing the portable object through the first serial communications interface;

the at least one external terminal requesting a secure service from the applications server of the communications network;

the at least one external terminal receiving from the applications server of the communications network secure data, the data relating to the secure service; and the at least one external terminal transmitting the secure data relating to the secure service to the portable object via the first serial communications interface.

9. The method of operating portable objects according to claim 8, wherein initializing: includes the at least one external terminal receiving from a global management server a generic secure application for the secure service of the portable object and the secure data, which includes personalization data for the requested secure service; and transmitting the generic secure application and the personalization data to the portable object through the first serial communications interface of the portable object.

10. The method of operating portable objects according to claim 8, wherein the secure data transmitted to the at least one external terminal comprises data of a secure application relating to the secure service as transmitted by the applications server of the communications network for the requested secure service.

* * * * *